(12) United States Patent  
Knoedgen

(10) Patent No.: US 9,001,543 B2  
(45) Date of Patent: Apr. 7, 2015

(54) ACTIVE RECTIFIER WITH MODULATION

(71) Applicant: Dialog Semiconductor GmbH, Kirchheim-Teck/Nabern (DE)

(72) Inventor: Horst Knoedgen, Munich (DE)

(73) Assignee: Dialog Semiconductor GmbH, Kirchheim/ Teck-Nabern (DE)

( * ) Notice: Subject to any disclaimer, the term of this patent is extended or adjusted under 35 U.S.C. 154(b) by 113 days.

(21) Appl. No.: 13/779,120

(22) Filed: Feb. 27, 2013

(65) Prior Publication Data

US 2013/0235632 A1  Sep. 12, 2013

(30) Foreign Application Priority Data

Mar. 7, 2012  (EP) ..................... 12158428

(51) Int. Cl.
- *H02M 7/06* (2006.01)
- *H02M 3/335* (2006.01)
- *H02J 7/00* (2006.01)
- *H02M 1/00* (2006.01)

(52) U.S. Cl.
CPC ............ *H02M 7/06* (2013.01); *H02M 3/33592* (2013.01); *H02M 2001/0045* (2013.01); *H02M 3/33523* (2013.01); *H02J 7/00* (2013.01); *Y02B 70/1475* (2013.01)

(58) Field of Classification Search
USPC ............ 363/17, 20, 24, 81, 84, 125, 126, 127
See application file for complete search history.

(56) References Cited

U.S. PATENT DOCUMENTS

| | | | | |
|---|---|---|---|---|
| 4,884,186 A | * | 11/1989 | Small ............................ | 363/132 |
| 5,973,945 A | * | 10/1999 | Balakrishnan et al. ......... | 363/80 |
| 6,930,893 B2 | * | 8/2005 | Vinciarelli ....................... | 363/17 |
| 7,808,299 B2 | * | 10/2010 | Mao et al. ....................... | 327/530 |
| 7,929,323 B2 | * | 4/2011 | Schmidt .......................... | 363/52 |
| 8,416,015 B2 | * | 4/2013 | Tsuchiya ....................... | 327/583 |
| 8,760,128 B2 | * | 6/2014 | Xu et al. ........................ | 323/222 |
| 2005/0146295 A1 | | 7/2005 | Miyamoto et al. | |
| 2009/0243028 A1 | * | 10/2009 | Dong et al. ................... | 257/499 |

FOREIGN PATENT DOCUMENTS

EP              2 071 716         6/2009

OTHER PUBLICATIONS

European Search Report 12158428.8-1242 Mail date—Dec. 18, 2012, Dialog Semiconductor GmbH.

* cited by examiner

*Primary Examiner* — Adolf Berhane

(74) *Attorney, Agent, or Firm* — Saile Ackerman LLC; Stephen B. Ackerman

(57) ABSTRACT

Described is a rectification circuit to generate a direct current at an output of the rectification circuit subject to an alternating voltage at an input of the rectification circuit. The rectification circuit comprises: coupling means at the input to receive the alternating voltage from a galvanically decoupled electronic subsystem; a first switch arranged between the coupling means and the output to block current in a first direction and to conduct current in a second direction, wherein a resistance of the first switch is adjustable; a first modulation unit to receive encoded information; mapping the encoded information to a first modulation state, wherein each modulation state specifies a resistance value and/or a temporal evolution of the resistance value; adjusting the resistance of the first switch, thereby modulating the current conducted by the first switch according to the first modulation state.

24 Claims, 10 Drawing Sheets

ACTIVE RECTIFIER WITH MODULATION

1. TECHNICAL FIELD

The present disclosure relates to isolated electrical systems coupled e.g. by a transformer/inductor system, a piezo transformer, a capacitor or other isolation means. In particular, the present disclosure relates to a method and system for communicating across isolation means in isolated electrical systems.

2. BACKGROUND

Many electrical applications require a galvanic isolation of electrical subsystems. By way of example, wireless charging applications require the transfer of energy from a mains power supply to an electronic device comprising a battery, without any wired coupling, between a charging unit (receiving power from the mains power supply) and the electronic device. The energy is typically transferred from the charging unit to the electronic device through inductive coupling. The charging unit may use an induction coil (the primary side of a transformer) to create an alternating electromagnetic field. A second induction coil (the secondary side of the transformer) in the electronic device takes energy from the electromagnetic field and converts the energy into an electrical current to supply power to charge the battery of the electronic device. The first and the second induction coils form an electrical transformer, when arranged in proximity with each other. The distances between the first and second induction coil can typically be increased when using resonant inductive coupling.

The charging unit (comprising the first induction coil) and the electronic device (comprising the second induction coil) are one particular example for an isolated electronic system comprising a first subsystem (e.g. the charging unit) and a second subsystem (e.g. the electronic device), wherein the first and second subsystems are galvanically isolated. It may be desirable to provide communication means between the first and the second subsystems, e.g. from the second subsystem to the first subsystem and vice versa. In the context of wireless charging such communication means may be used e.g. to inform the charging unit of the charging status of the battery comprised in the electronic device. The present disclosure describes a system and a method for enabling communication between the subsystems of an isolated electronic system in an efficient manner. The communication system and method described herein make use of the already available hardware components and can therefore be implemented in a cost efficient manner.

SUMMARY

According to an aspect a rectification circuit is described. The rectification circuit may be configured to generate a direct current at an output of the rectification circuit subject to an alternating voltage at an input of the rectification circuit. The rectification circuit may comprise a half-wave rectifier (configured to generate a direct current during a first phase, e.g. the positive or negative phase, of the alternating voltage) or a full-wave rectifier (configured to generate a direct current during a first and second phase, e.g. the positive and the negative phase, of the alternating voltage).

The rectification circuit may comprise coupling means at the input, configured to receive the alternating voltage from a galvanically decoupled electronic subsystem. The coupling means may e.g. comprise an induction coil of a transformer. The transformer may be configured to induce the alternating voltage at the coupling means using an alternating current through a corresponding induction coil of the transformer at the decoupled electronic subsystem. Alternatively the coupling means may e.g. comprise a piezo electric element which is coupled to another piezo electric element at the decoupled electronic subsystem. As such, an alternating voltage at the piezo electric element of the decoupled electronic subsystem may be coupled to the piezo electric element of the coupling means.

The rectification circuit may comprise a first switch arranged between the coupling means and the output of the rectification circuit. The first switch may be part of a rectifier (e.g. a half-wave or full-wave rectifier). The first switch may be configured to block current in a first direction and to conduct current in a second direction, opposite to the first direction. The first direction may correspond to a first (e.g. a negative) polarization of the voltage across the first switch and the second direction may correspond to a second (e.g. a positive) polarization of the voltage across the first switch. As a result of the alternating voltage, the polarization of the voltage across the first switch may alternate between the first and the second direction at the alternation frequency of the alternating voltage.

The alternating voltage may comprise a first phase (e.g. a negative half-wave of the alternating voltage) and a second phase (e.g. a positive half-wave of the alternating voltage). During the first phase, the voltage across the first switch may be in the first polarization and in the second phase, the voltage across the first switch may be in the second polarization. The first phase and the second phase may alternate at twice the alternation frequency. The first switch may be configured to block current during the first phase and configured to conduct current during the second phase. The current which is conducted by the first switch (i.e. the current during the second phase) may contribute to the direct current. In particular, the current which is conducted by the first switch may correspond to the direct current during the second phase.

The rectification circuit may comprise a second switch arranged between the coupling means and the output of the rectification circuit. The second switch may be configured in a similar manner than the first switch. However, the second switch may be arranged such that the polarization of the voltage across the second switch is opposed to the polarization of the voltage across the first switch. As such, the second switch may conduct current during the first phase of the alternating voltage, thereby contributing to the direct current during the first phase. Furthermore, the second switch may be configured to block current during the second phase. As indicated above, the second switch may be arranged such that the polarization of the voltage across the second switch is opposed to the polarization of the voltage across the first switch. By doing this, it can be ensured that the current provided by the second switch has the same direction as the current provided by the first switch. As such, the direct current provided by the rectification circuit may correspond to the current through the first switch (during the second phase) and to the current through the second switch (during the first phase).

Typically, the first switch is coupled to a first output port of the coupling means and the second switch is coupled to a second output port of the coupling means, wherein the alternating voltage is provided between the first and second output port of the coupling means. Furthermore, the first switch and the second switch are typically coupled to a same output port at the output of the rectification circuit. Typically, the output of the rectification circuit comprises two output ports, wherein a load voltage is provided across the two output ports. By coupling the first and second switches as outlined above, it can be ensured that the voltage drop across the first and second switch is opposed to each other and that the current provided by the first switch within the second phase has the same direction as the current provided by the second switch within the first phase, thereby providing a direct current during the first and second phase.

The first and/or second switch may comprise any one or more of: a diode, and a transistor e.g. a MOS (Metal Oxide Semiconductor) transistor. By way of example, the first and/or second switch may be MOS transistors comprising a body diode. A resistance of the first switch (and/or the second switch) when conducting current may be adjustable. This may be achieved e.g. by adjusting a drive voltage to the first/second switch (notably by adjusting a voltage applied to the gate of the first/second switch). By way of example, a MOS transistor may be operated as a body diode (have a maximum resistance), at a low gate voltage (having a medium resistance) and at a high gate voltage (having a minimum resistance).

The rectification circuit may comprise a first modulation unit configured to receive encoded information. The encoded information may be information to be transmitted from the rectification circuit to the decoupled electronic subsystem. By way of example, the rectification circuit may be comprised within an electronic device comprising a battery, and the decoupled electronic subsystem may comprise a charging unit for charging the battery of the electronic device. The encoded information may be related to a charging status of the battery of the electronic device. The rectification unit or the electronic device may comprise an encoding unit configured to encode the information to be transmitted to the decoupled electronic subsystem, thereby providing the encoded information. The encoded information may comprise an error detection and/or error correction code.

The first modulation unit may be configured to map the encoded information to a first modulation state from a plurality of different modulation states of the resistance of the first switch. A modulation state of the resistance of the first switch typically specifies a resistance value and/or a temporal evolution of the resistance value of the resistance of the first switch. In other words, the modulation state may specify a resistance value at a particular time instance and/or a sequence of resistance values at a corresponding sequence of time instances.

The first modulation unit may be configured to adjust the resistance of the first switch according to the first modulation state, thereby modulating the current conducted by the first switch according to the first modulation state. In particular, the first modulation unit may be configured to adjust the resistance of the first switch, when the first switch is conducting current (e.g. during the second phase of the alternating voltage, i.e. when the voltage across the first switch has a second polarization). As a result of the modulation of the resistance, the current conducted by the first switch is modulated, i.e. the direct current is modulated. Typically, the current through the first switch is derived from current through the coupling means (e.g. from the induction coil comprised within the coupling means). This means that the modulated current through the first switch also affects the current through the coupling means. By consequence, the current through the coupling means is modulated according to the first modulation state.

The first modulation unit may be configured to adjust the resistance of the first switch according to any one of the plurality of modulation states. A modulation state of the plurality of modulation states may comprise any one or more of: adjusting the resistance to one or more of a plurality of resistance values (e.g. for amplitude modulation); and periodically adjusting the resistance of the first switch between a first and a second resistance value of the plurality of resistance values at one of a plurality of adjustment frequencies (e.g. for frequency modulation).

The plurality of modulation states may be selected such that an average of the direct current in a pre-determined time interval remains substantially constant. This may be important in order to ensure a continuous and constant energy flow towards a load coupled to the rectification circuit. By way of example, the rectification circuit may be a solid state lighting (SSL) device, e.g. a LED (Light Emitting Diode) or a OLED (organic LED). Such SSL devices typically require a continuous energy flow, in order to ensure a constant (flickerless) emission of light. This may be achieved by always and only performing frequency modulation (even in a default state, when no information is transmitted). It should be noted that in order to ensure a flickerless emission of light, the continuous energy flow should be continuous with respect to variations of light intensity which are at frequencies visible to the human eye (e.g. frequencies below 400 Hz). Intensity variations above such frequencies (e.g. variations due to the modulation of the current described herein) are typically not visible to the human eye. Consequently, frequency modulation should be performed at modulation frequencies above the frequencies of intensity variations which are visible to the human eye.

In particular, the first modulation unit may be configured to periodically adjust the resistance of the first switch between the first resistance value and the second resistance value at a first frequency of the plurality of adjustment frequencies, thereby providing the first modulation state. The first modulation unit may be further configured to periodically adjust the resistance of the first switch between the first resistance and the second resistance at a second frequency of the plurality of adjustment frequencies, thereby providing a second modulation state. Typically the first and second frequencies are higher than the alternation frequency of the alternating voltage. The average direct current during the second phase of the alternating voltage (i.e. the direct current during the phase when the first switch is conducting) may be substantially the same in the first modulation state and in the second modulation state.

The rectification unit may further comprise a second modulation unit configured to receive encoded information and to map the encoded information to a third modulation state from a plurality of different modulation states of the resistance of the second switch. In a similar manner to the first switch, each of the plurality of modulation states may specify a resistance value and/or a temporal evolution of the resistance value of the resistance of the second switch. The second modulation unit may be configured to adjust the resistance of the second switch according to the third modulation state of the resistance of the second switch, thereby modulating the current conducted by the second switch according to the third modulation state of the resistance of the second switch.

According to another aspect, a galvanically decoupled system is described. The galvanically decoupled system may comprise a first subsystem configured to generate a varying current, e.g. an alternating current. Furthermore, the system may comprise a second subsystem comprising a rectification unit according to any of the aspects outlined in the present document. The second subsystem (notably the rectification circuit) may be configured to receive an alternating voltage derived from the varying current (e.g. via a transformer). Furthermore, the second subsystem may be configured to modulate a resistance of the rectification unit according to a first modulation state derived from encoded information. The first subsystem may comprise modulation sensing means configured to detect the first modulation state e.g. from the varying current.

By way of example, the first subsystem may comprise a half bridge comprising a high side switch and a low side switch. The high side and low side switches may be opened and closed in an opposed and periodic manner (at the alternation frequency), thereby generating an alternating current. In such a case, the modulation sensing means may comprise a resistor to measure a current through the high side switch and/or the low side switch. The second subsystem may further comprise a decoding unit configured to determine the encoded information from the first modulation state.

The first subsystem may comprise a first induction coil of a transformer and the second subsystem may comprise a second induction coil of the transformer. The transformer may be configured to inductively couple the alternating current across the first and second subsystems. In such a case, the modulation sensing means may comprise an auxiliary induction coil of the transformer configured to sense the first modulation state from the voltage across the auxiliary induction coil.

According to another aspect, a method for communicating encoded information from a second subsystem to a first subsystem is described. The first and second subsystems may be galvanically decoupled. The method comprises receiving an alternating voltage from the first subsystem at the second subsystem. The method proceeds in blocking current in a first direction and conducting current in a second direction, opposite to the first direction, to provide a direct current. The current may be conducted in the second direction via an adjustable resistance. The method further comprises the step of receiving encoded information and of mapping the encoded information to a first modulation state from a plurality of different modulation states of the adjustable resistance. Each of the plurality of modulation states may specify a resistance value and/or a temporal evolution of the resistance value of the adjustable resistance. The method proceeds in adjusting the adjustable resistance according to the first modulation state, thereby modulating the conducted current in the second direction according to the first modulation state.

It should be noted that the methods and systems including its preferred embodiments as outlined in the present disclosure may be used stand-alone or in combination with the other methods and systems disclosed in this document. Furthermore, all aspects of the methods and systems outlined in the present disclosure may be arbitrarily combined. In particular, the features of the claims may be combined with one another in an arbitrary manner.

BRIEF DESCRIPTION OF THE DRAWINGS

The invention is explained below in an exemplary manner with reference to the accompanying drawings, wherein.

DETAILED DESCRIPTION

Figure 1:
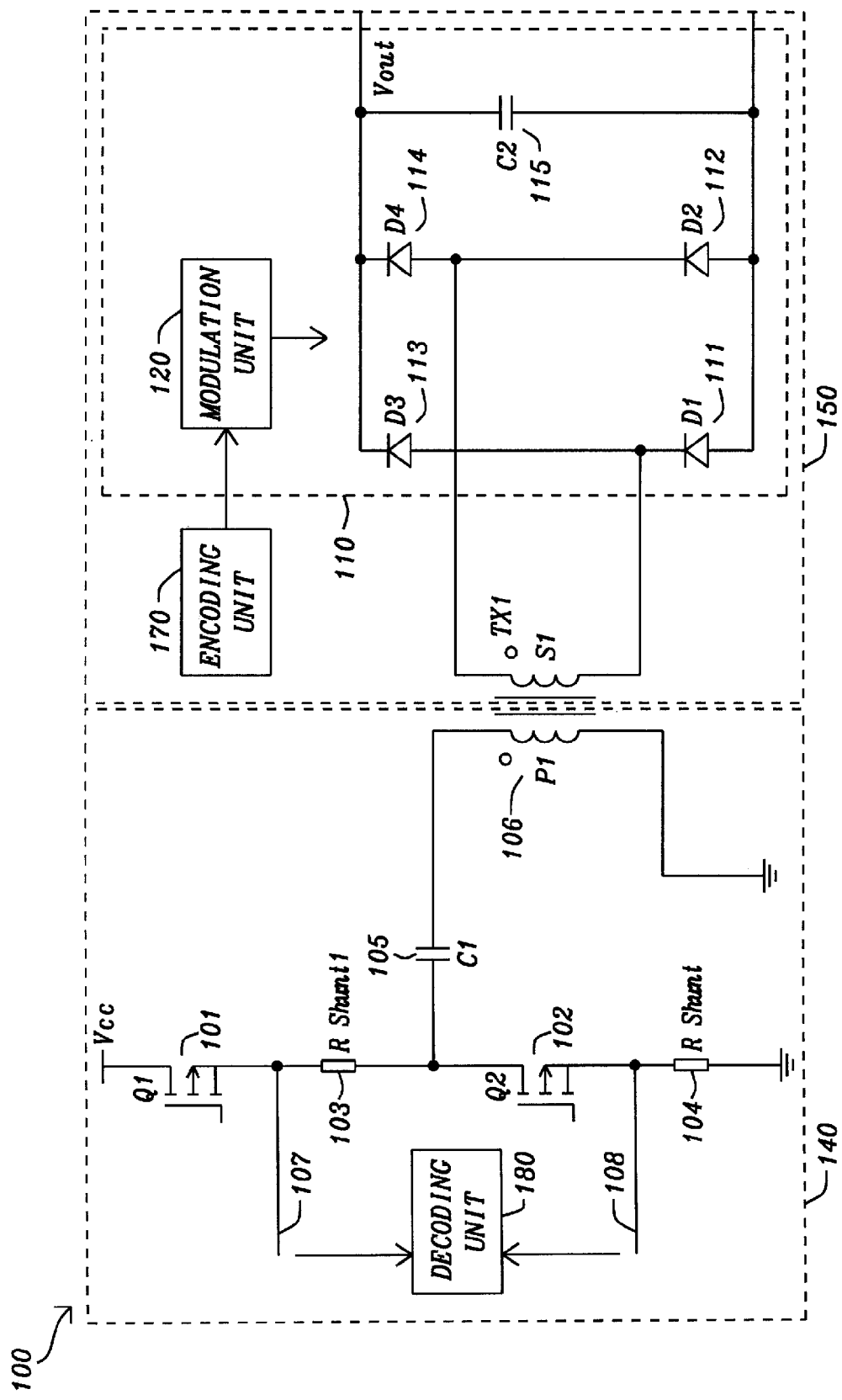
FIG. 1 illustrates the circuit diagram of an example isolated electrical system comprising a full wave rectifier.

FIG. 1 shows the circuit diagram of an example isolated electrical system 100. In particular, FIG. 1 shows the circuit diagram of an example wireless charging system 100 comprise a first subsystem 140 (i.e. the charging unit) and a second subsystem 150 (i.e. the electronic device). The charging unit 140 comprises a high side switch Q1 101 and a low side switch Q2 102 which are arranged to generate an alternating current at the capacitor C1 105 and the first induction coil P1 of the transformer 106. The capacitor C1 105 may be used to eliminate a DC (direct current) voltage across the first induction coil P1 of the transformer 106.

The high side switch Q1 101 and the low side switch Q2 102 form a half bridge which may be used to generate an AC (alternating current) voltage at a pre-determined frequency (typically referred to as the converter frequency). The converter frequency may be in the range of 20 kHz to several MHz. The high side and the low side switches 101, 102 may be transistors, e.g. MOS transistors such as PMOS or NMOS transistors. The capacitor C1 105 and the first induction coil P1 of the transformer 106 may form an LC circuit having a pre-determined resonance frequency which depends on the capacitance C of the capacitor 105 and the inductance L of the first induction coil. As such, the charging unit 140 may be configured to perform resonant inductive coupling, thereby increasing the possible distances between the charging unit 140 and the electronic device 150. The higher distances may be due to the higher voltages which may be generated when using resonant inductive coupling, thereby compensating for the higher distances.

The AC voltage generated by the half bridge leads to an alternating current in the first induction coil P1 of the transformer 106, which is coupled to the second induction coil S1 of the transformer 106 comprised within the electronic device 150. Consequently, the alternating current in the second induction coil S1 of the transformer 106 is derived from the alternating current in the first induction coil P1. Both alternating currents are typically proportional to each other, wherein the proportionality factor typically depends on the coupling efficiency of the transformer 106.

In addition to the second induction coil S1 of the transformer 106, the electronic device 150 comprises a rectifier 110 comprising the switches D1 111, D2 112, D3 113, D4 114 and a smoothening capacitor C2 115. The switches 111, 112, 113, 114 may be diodes which automatically switch between the on-state and the off-state based on the voltage across the diodes. In particular, if the voltage across the diode is negative and the diode is operated in its reverse-biased mode, the diode is in the off-state. On the other hand, if a positive voltage greater than the threshold voltage of the diode (also referred to as the diode voltage $V_D$) is applied to the diode, i.e. if the diode is operated in its forward-biased mode, then the diode is in the on-state. Alternatively, some or all of the switches 111, 112, 113, 114 may be implemented as transistors, e.g. MOS transistors, thereby providing a so called active rectifier. The transistors may be switched between the on-state and the off-state in synchronization with the alternating current (i.e. in sync with the converter frequency), in order to provide a full-wave rectification of the alternating current. The capacitor 115 which is arranged in parallel to, the load may be used to smoothen the rectified current. The rectifier 110 provides an output voltage Vout to the load.

The electronic device 150 and in particular the rectifier 110 comprise a modulation unit 120 configured to modulate the voltage drop across the rectifier 110, and by consequence to modulate the current provided by the rectifier 110. The modulation of the current provided by the rectifier 110 leads to a modulation of the alternating current at the second induction coil of the transformer 106. This modulation of the alternating current is inductively coupled to the first induction coil of the transformer 106, thereby impacting the current through the switches 101, 102 of the half bridge. The charging unit 140 comprises modulation sensing means 103, 104 configured to sense the modulation on the current through the switches 101, 102 of the half bridge. In other words, the modulation sensing means 103, 104 are configured to provide an indication of the modulation performed in the rectifier 110 at the output 107, 108 of the modulation sensing means 103, 104. In the illustrated example, the modulation sensing means 103, 104 are implemented as shunt resistors 103, 104, wherein the outputs 107, 108 provide the voltage drop across the shunt resistors 103, 104 as an indication of the current through the high side switch 101 and/or the low side switch 104.

Figure 3:
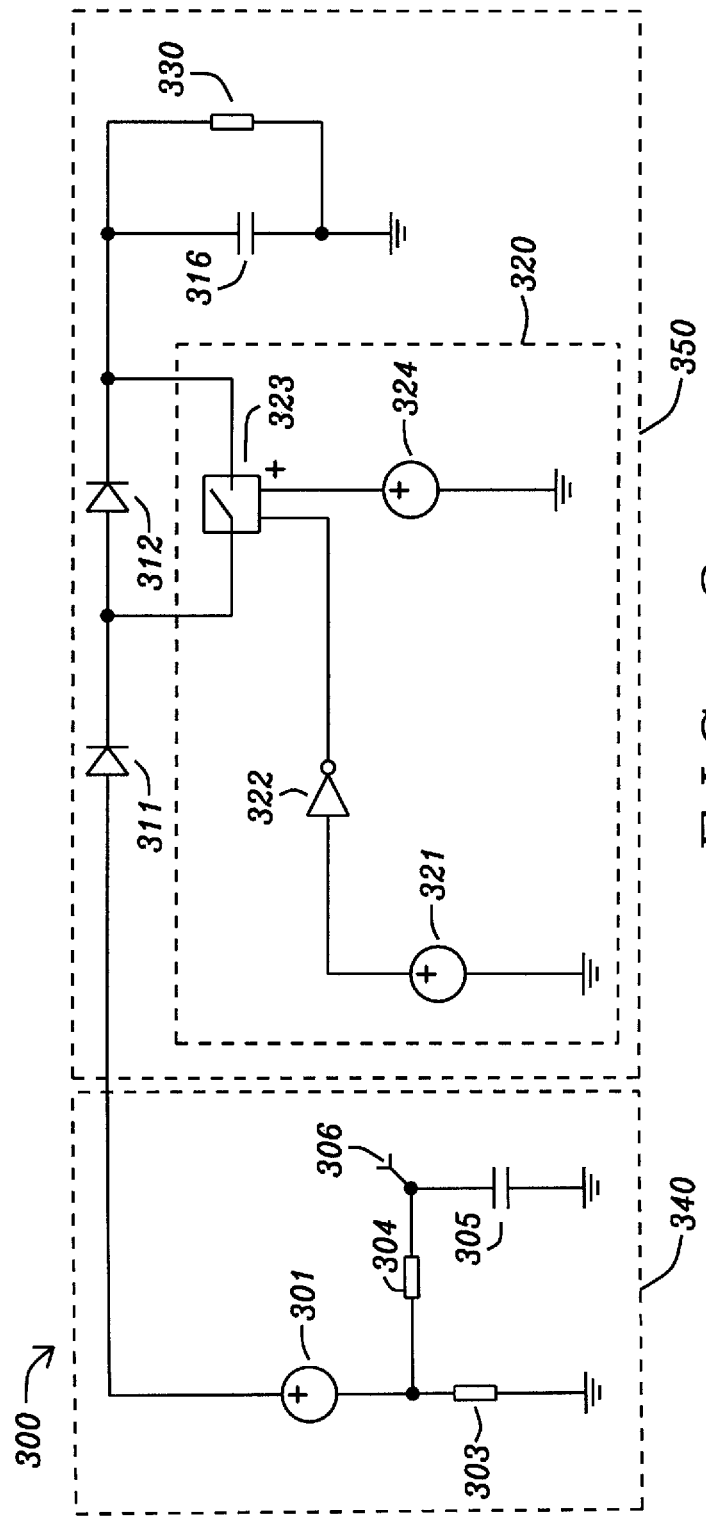
FIG. 3 shows an example circuit diagram illustrating the functional principle of a modulated rectifier.
Figure 4:
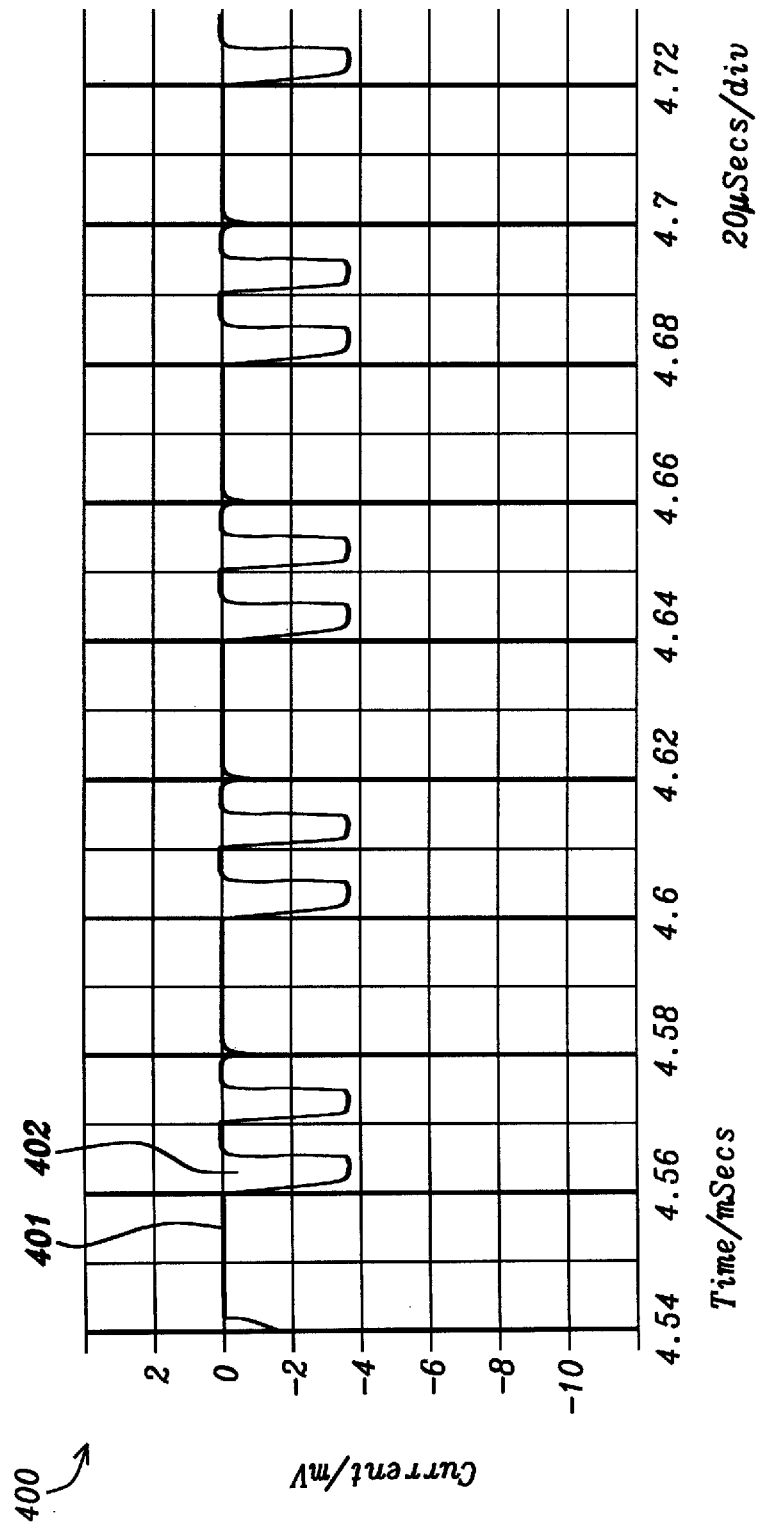
FIG. 4 shows an example of a modulated current.
Figure 5:
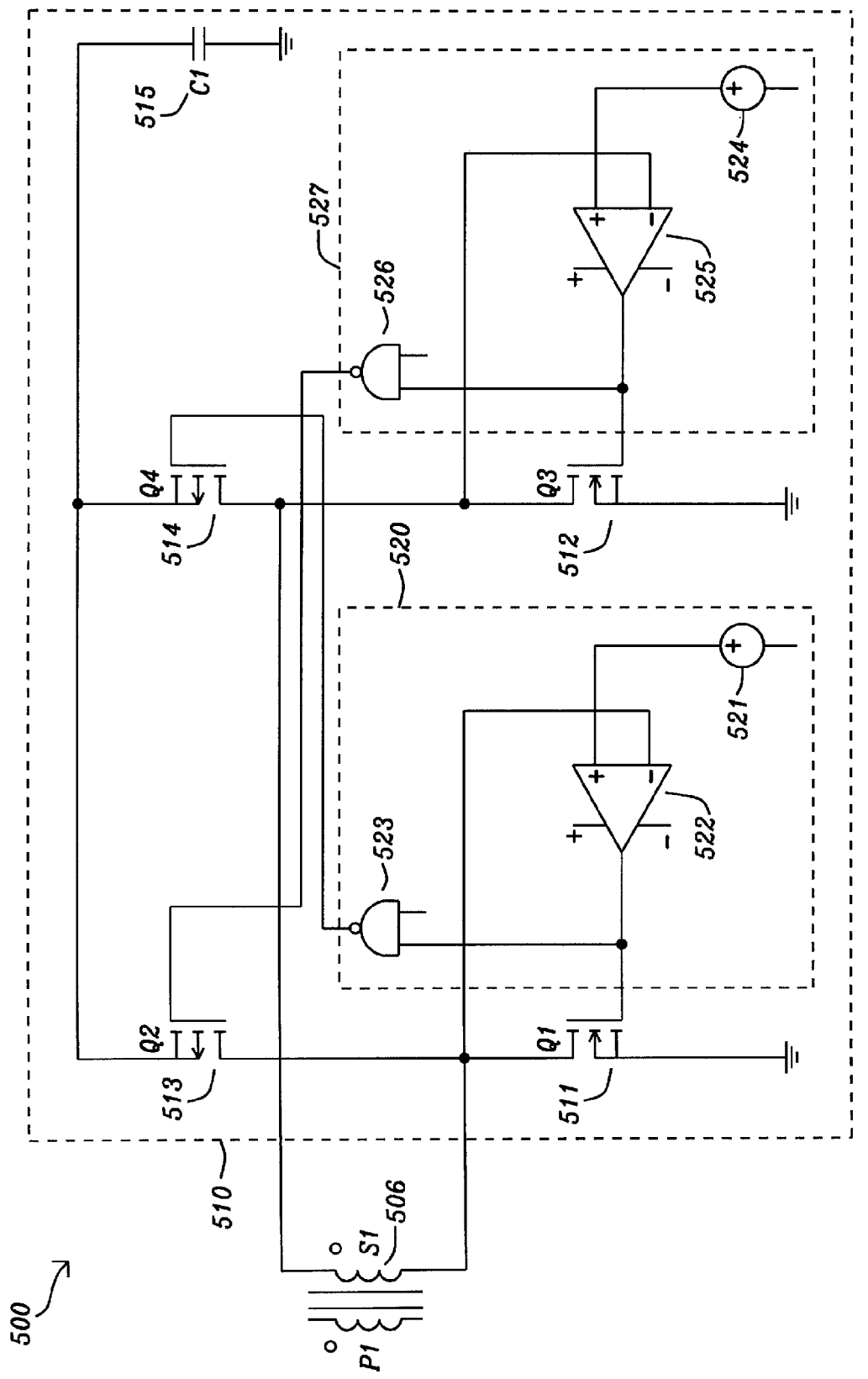
FIG. 5 shows the circuit diagram of an example rectification circuit comprising an example modulation unit.

The functional principle of the modulation unit 120 and the modulation sensing means 103, 104 will be illustrated in further detail in the context of FIGS. 3, 4 and 5. Overall, it may be stated that the modulation unit 120 may be used to modulate a voltage drop across the rectifier 110, in order to induce a modulation on the load current. This modulation of the load current is coupled to the alternating current in the charging unit 140 via the first and second induction coils of the transformer 106. The modulation of the alternating current in the charging unit 140 can be measured at the outputs 107, 108 of the current sensing means 103, 104. In particular, the modulation of the positive half-wave of the alternating current can be measured as a modulated voltage drop across the resistor 103 and the modulation of the negative half-wave of the alternating current can be measured as a modulated voltage drop across the resistor 104.

As such, the modulation unit 120 and the current sensing means 103, 104 can be used to provide a communication path from the electronic device 150 to the charging unit 140. The electronic device 150 may comprise an encoding unit 170 configured to encode information (e.g. a state of charging of a battery comprised within the electronic device 150). The encoded information may be mapped to one or more modulation states of the modulation unit 120, wherein the modulation unit 120 modulates the current according to the one or more modulation states. The one or more modulation states are detected in a decoding unit 180 within the charging unit 140 which demodulates the sensed voltage at the outputs 107, 108 and which decodes the encoded information.

It should be noted that in principle encoded information may be communicated from the electronic device 150 to the charging unit 140 during the positive and negative half-waves for the half bridge comprising the switches 101, 102. However, due to a relatively high voltage difference between the high side switch 101 and ground during a positive half-wave, the current sensing means 103 may not be able to provide reliable measurements of the modulation. Hence, it may be preferable to restrict the communication of encoded information to the negative half-wave, when the low-side switch 102 is closed (and the high-side switch 101 is open).

Figure 2:
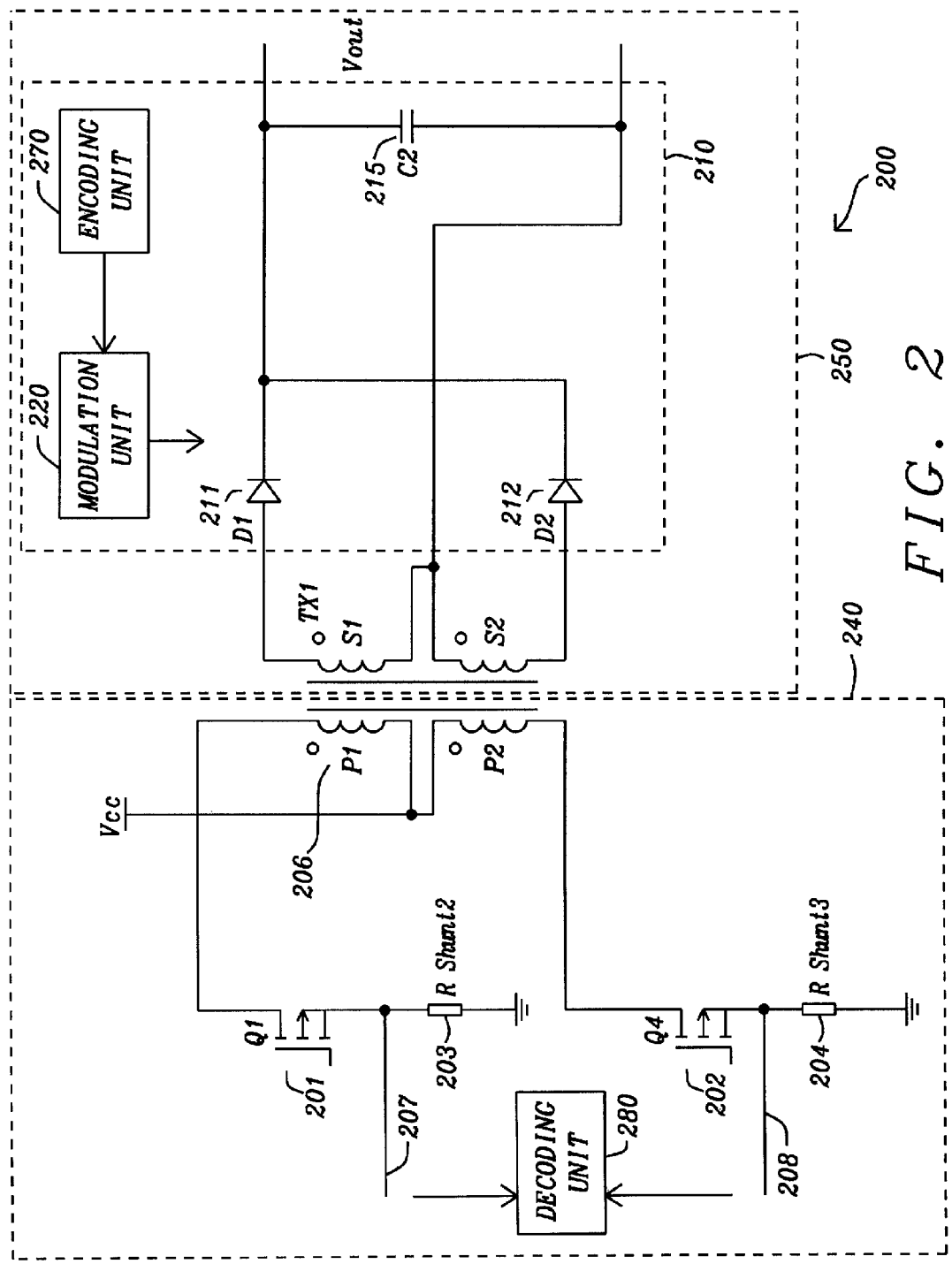
FIG. 2 illustrates the circuit diagram of an example isolated electrical system comprising a full wave rectifier with a center tap transformer.

FIG. 2 shows the circuit diagram of another example isolated system 200 (e.g. an example wireless charging system 200). The wireless charging system 200 comprises a charging unit 240 with the high side switch Q3 201 and the low side switch Q4 202 configured to generate an alternating current through the first induction coils P1, P2 of the transformer 206. In the illustrated example, the transformer 206 is implemented as a center tap transformer 206 (also referred to as a push pull transformer) comprising an upper pair of induction coils P1, S1 and a lower pair of induction coils P2, S2. The first upper and lower induction coils P1, P2 (on the primary side of the transformer 206) are coupled in the center of the transformer 206 to the supply voltage Vcc.

The electronic device 250 is coupled to the charging unit 240 via the second upper and lower induction coils S1, S2 (on the secondary side) of the transformer 206. The electronic device 250 comprises a rectifier 210 comprising two switches D1 211, D2 212 which provide full-wave rectification of the coupled alternating current. In the illustrated example, the two switches 211, 212 are implemented as diodes, i.e. as automatic switches. Alternatively or in addition, some or all of the switches 211, 212 may be implemented as active switches, such as transistors (e.g. MOS transistors). Furthermore, the rectifier 215 comprises a smoothening capacitor C2 215 arranged in parallel to the output of the rectifier 210.

In a similar manner to FIG. 1, the isolated system 200 comprises a modulation unit 220 configured to modulate the current within the rectifier 210. For this purpose, the two switches 211, 212 may be implemented as transistors comprising a body diode. The modulation unit 220 may be configured to vary the resistance of the switches 211, 212, thereby varying the voltage drop across the rectifier 210, thereby modulating the current within the rectifier 210. The modulation of the current within the rectifier 210 may be sensed by modulation sensing means 203, 204 within the charging unit 240. In the illustrated example, the modulation sensing means 203, 204 are implemented as shunt resistors R Shunt2 203, R Shunt3 204 which transform the current through the high side and/or low side switches 201, 203 into a voltage drop which can be provided at the outputs 207, 208. Other sensing means may e.g. make use of current mirrors. Further examples for sensing means comprise a coil system for frequency monitoring, a Hall sensor or a current transformer, which changes its behavior as a function of the current.

Furthermore, the electronic device comprises an encoding unit 270 configured to encode information which is to be communicated to the charging unit 240. The encoded information may be e.g. a sequence of bits. The encoding unit 270 may make use of error detection and/or error correction schemes when determining the encoded information. Examples for error detection schemes are parity bits, checksums, cyclic redundancy checks. Examples for schemes which also allow for error correction are e.g. error-correcting codes. As such, the encoded information may comprise redundant information, which may be used for error detection and/or error correction.

The encoded information may be passed to the modulation unit 220 which may be configured to assign the encoded information (e.g. a sequence of bits) to one or more modulation states and/or to a sequence of modulation states. Furthermore, the modulation unit 220 may be configured to apply the modulation (in accordance to the modulation states) to the current within the rectifier 250, thereby communicating the encoded information to the current sensing means 203, 204.

At the output 207, 208 of the current sensing means, the modulated current/voltage may be passed to a demodulation and decoding unit 280. The demodulation and decoding unit 280 may be configured to demodulate the modulated current/voltage. For this purpose, the demodulation and decoding unit 280 may apply one or more filters (e.g. bandpass filters), in order to detect a frequency modulation of the modulated current/voltage. Alternatively or in addition, the demodulation and decoding unit 280 may apply one or more comparators, in order to determine an amplitude modulation of the modulated current/voltage. As such, the demodulation and decoding unit 280 may be configured to determine the one or more modulation states and/or the sequence of modulation states from the modulated current/voltage. The detected modulation states may be mapped to the encoded information which may then be decoded, in order to provide the charging unit 140 with the information transmitted from the electronic device 250.

FIG. 3 shows a circuit diagram which illustrates the functional principle of rectifier current modulation for communication purposes across an isolated electronic system 300. The isolated system 300 comprises a first subsystem 340 (e.g. a charging unit) and a second subsystem 350 (e.g. an electronic device comprising a battery). Typically, the first subsystem 340 and the second subsystem 350 are isolated e.g. using a galvanic isolation such as a transformer (as shown e.g. in FIGS. 1 and 2). Such an isolation between the first and second subsystems 340, 350 is not shown in FIG. 3 for simplicity reasons.

The first subsystem 340 comprises a voltage source 301 providing an alternating voltage. This alternating voltage creates an alternating current which is passed to the second subsystem 350 (e.g. via inductive coupling). The alternating current is rectified using one or more switches 311, 312. In the illustrated example, a first diode 311 and a second diode 312 are used. The two diodes 311, 312 are arranged in series, thereby providing a half-wave rectification of the alternating current. The electronic device 350 comprises a smoothening capacitor 316 which is arranged in parallel to the load 330 of the rectifier. The load 330 may be e.g. a battery comprised within the electronic device 350.

The second subsystem 350 comprises a modulation unit 320. In the illustrated example, the modulation unit 320 comprises a modulation switch 323 which is arranged in parallel to the second diode 312 and which is configured to bypass the second diode 312 when the modulation switch 323 is in the on-state. By doing this, the modulation switch 323 can be used to modulate the voltage drop across the series of diodes 311, 312, when the two diodes 311, 312 are operated in their forward-biased mode. As indicated above, a diode 311, 312 is operated in its forward-biased mode by applying a positive voltage across the diode 311, 312, wherein the positive voltage is greater than the threshold voltage of the diode 311, 312. If the modulation switch 323 is in the off-state, the voltage drop across the first and second diodes 311, 312 is the sum of the first threshold voltage across the first diode 311 and the second threshold voltage across the second diode 312. On the other hand, if the modulation switch 323 is in the on-state, the voltage drop across the first and second diodes 311, 312 corresponds to the first threshold voltage (if assuming that the voltage drop across the modulation switch 323 is negligible or small compared to the second threshold voltage). Hence, by switching the modulation switch 323 between the on-state and the off-state, the voltage drop across the rectifier diodes 311, 312 can be modulated. This also results in a modulation of the output voltage across the capacitor 316 and across the load 330, because the sum of the voltage drop across the rectifier diodes 311, 312 and the output voltage corresponds to the voltage provided by the voltage source 301 (when neglecting the voltage drop at the sensing resistor 303). A modulation of the output voltage leads to a modulation of the current through the load, and consequently to a modulation of the current provided by the rectifier. Consequently, the modulation switch 323 can be used to modulate the current through the rectifier diodes 311, 312. The current through the rectifier diodes 311, 312 is (inductively) coupled to the first subsystem 340, such that a modulation of the current through the rectifier diodes 311, 312 is coupled back to the first subsystem 340. It is proposed in the present disclosure to use this backward coupling of modulation of the current as communication means between the second subsystem 350 and the first subsystem 340.

FIG. 3 illustrates an example control circuit for controlling the modulation switch 323. The control circuit comprises a first voltage source 321, a second voltage source 324 and an inverter 322. By appropriately controlling the first and second voltage sources 321, 324, the modulation switch 323 may be switched between the on-state and the off-state, thereby modulating the current in the rectifier and thereby communicating information from the second subsystem 350 to the first subsystem 340. As indicated above, the information may be encoded into a sequence of bits (e.g. comprising error detection and/or error correction). The sequence of bits may be used to control the modulation switch 323, thereby transmitting the encoded information from the second subsystem 350 to the first subsystem 340.

The first subsystem 340 comprises a shunt resistor 303 (also referred to as a sensing resistor 303), as well as a low pass filter comprising a resistor 304 and a capacitor 305. The low pass filter may be used to reduce or remove oscillations of the current through the shunt resistor 303. FIG. 4 shows a modulated current 400 through the shunt resistor 303 (or a modulated voltage drop at the shunt resistor 303). It can be seen that during the negative wave of the alternating voltage provided by the voltage source 301, the current 401 is zero (as the rectifier diodes 311, 312 are operated in reverse-biased mode). On the other hand, during a positive wave of the alternating voltage, the rectifier diodes 311, 312 are operated in forward-biased mode, thereby allowing for a current flow 402. This current flow can be modulated by means of the modulation unit 320, i.e. by modulating the voltage drop across the rectifier diodes 311, 312.

Hence, a modulation within the rectifier of the second subsystem 350 can be sensed by the modulation sensing means (i.e. at the shunt resistor 303) of the first subsystem 303. The modulation within the rectifier may be achieved by modulating the voltage drop across one or more of the switches 311, 312 which are in the on-state. This modulation of the voltage drop leads to a modulation of the current provided by the rectifier, i.e. to a modulation of the current provided to the load 330. The modulated current in the second subsystem 350, in particular the modulations on the current in the second subsystem 350, are coupled back to the current within the first subsystem 340 (e.g. via a transformer 106, 206) and can therefore be measured at the first subsystem 340 using modulation sensing means 303. As indicated above, the first subsystem 340 may further comprise a demodulation unit for extracting the modulation state (or a sequence of modulation states) from the sensed current/voltage. Subsequently, the (sequence of) modulation states may be mapped to the encoded information, which may then be decoded by a decoding unit.

The modulation of the voltage drop across the rectifier of the second subsystem 350 can be used to signal information from the second subsystem 350 to the first subsystem 340. By way of example, the second subsystem 350 can inform the first subsystem 340 of the charging status of a battery 330 comprised in the second subsystem 350. In another example, the second subsystem 350 may comprise a solid-state lighting (SSL) device such as alight emitting diode (LED) or an Organic LED (OLED) device. The SSL device may use the modulation within the rectifier to provide the first subsystem 340 (e.g. a power supply) with information regarding its illumination status (e.g. regarding the intensity of the emitted light). In general terms, the voltage drop across the rectifier within the second subsystem 350 may be modulated in a pre-determined manner, in order to provide information from the second subsystem 350 to the first subsystem 340, even though the first and second subsystems 340, 350 are (galvanically) isolated from each other.

The modulation of the voltage drop across the rectifier (and consequently the modulation of the current) may comprise amplitude modulation. Amplitude modulation may be achieved by controlling the total voltage drop across the rectifier to be at a limited number of N voltage values. Alternatively or in addition, the modulation of the voltage drop across the rectifier may comprise frequency modulation, by varying the voltage drop across the rectifier between a first amplitude and a second amplitude at a pre-determined number M of frequencies. Alternatively or in addition, the modulation of the voltage drop across the rectifier may comprise modulation at a pre-determined number L of duty cycles, by varying the ratio of the length of the voltage drop at the first amplitude and the length of the voltage drop at the second amplitude according to L pre-determined ratio values. Alternatively or in addition, the modulation may be changed along the time line, e.g. at a pre-determined number Q of modulation states/second. The above mentioned modulation schemes may be combined, thereby providing a maximum number of N times M times L states, of which Q states can be implemented (and communicated) per second. Hence, the modulation of the voltage drop across the rectifier can be used to encode up to log (N*M*L*Q) bits per second (wherein "*" is the multiply operator and "log" is the logarithm-to-the-base-two operator) of information from the second subsystem 350 to the first subsystem 340.

By way of example, the modulation unit 120, 220 may be configured to change the resistance of the rectifier 110, 210 (i.e. to change the voltage drop across the rectifier 110, 210) between a first and a second resistance value (i.e. N=2). As such, the modulation unit 120, 220 provides N=2 modulation states, which may be used to transmit log(N)=1 bit of information from the second subsystem 350 to the first subsystem 340. If the frequency of the alternating current is f=1 MHz, and if the modulation unit 120, 220 is configured to implement a different modulation state for each cycle of the alternating current, then log(N)*f=1 Mbit/second of encoded information can be transmitted from the modulation unit 120, 220. As indicated above, the encoded information can comprise error detection and/or error correction coding.

Alternatively or in addition, the modulation unit 120, 220 may be configured to perform frequency modulation. A first modulation state may comprise the periodic change between the first and second resistance values at a first frequency (higher than the frequency of the alternating current) (e.g. f1=10 MHz). The second modulation state may comprise the periodic change between the first and second resistance values at a second frequency (different from the first frequency) (higher than the frequency of the alternating current) (e.g. f2=5 MHz), i.e M=2. The modulation unit 120, 220 may be configured to implement a different modulation state for each cycle of the alternating current, thereby providing a transmission rate of log(M)*f=1 Mbit/second.

It should be noted that the communication of information from the second subsystem 350 to the first subsystem 340 via modulation of the rectifier current typically requires a synchronization of the modulation unit 120, 220 and the modulation sensing means 103, 203, and/or a synchronization of the encoding unit 170 and the decoding unit 180). In particular, it should be ensured that the encoded information is modulated onto the current at the rectifier 110, 210 at the same rate, as it is demodulated at the first subsystem 340. For this purpose, the first and second subsystem should make use of a common clocking. The common clocking may be derived from the frequency/cycle rate of the alternating current generated by the first subsystem 340 (e.g. by the high side/low side switches 101, 102 comprised within the first subsystem 340). The frequency/cycle rate of the alternating current may be detected independently at the first and at the second subsystem.

FIG. 5 shows the circuit diagram of an example electronic device 500 (i.e. of an example second subsystem 500). The electronic device 500 is coupled to a first subsystem (e.g. to a charging unit) via a transformer 506. The second induction coil (also referred to as the secondary side) of the transformer 506 is typically integrated within the electronic device 500. Furthermore, the electronic device 500 comprises an active rectifier 510 comprising four switches 511, 512, 513, 514 which correspond to the diodes 111, 112, 113, 114, respectively, of the rectifier 510 of FIG. 1. The active rectifier 510 also comprises a smoothening capacitor 515.

During a positive half-wave of the alternating voltage supplied across the transformer 506, the second high side switch 514 and the first low side switch 511 are in the on-state, whereas the first high side switch 513 and the second low side switch 512 are in the off-state. This phase of the active rectifier 510 may be referred to as the positive half-wave phase. During the positive half-wave phase, the voltage drop across the active rectifier 510 comprises the voltage drop across the switches which are in on-state, i.e. the voltage drop across the second high side switch 514 and the first low side switch 511. During a negative half-wave of the alternating voltage supplied across the transformer 506, the first high side switch 513 and the second low side switch 512 are in the on-state, whereas the second high side switch 514 and the first low side switch 511 are in the off-state (referred to as the negative half-wave phase of the active rectifier 510). During the negative half-wave phase, the voltage drop across the active rectifier 510 comprises the voltage drop across the switches which are in on-state, i.e. the voltage drop across the first high side switch 513 and the second low side switch 512.

In the illustrated example of FIG. 5, the high side switches 513, 513 are implemented as P channel MOS (metal-oxide semiconductor) FETs (field effect transistors), whereas the low side transistors are implemented as N channel MOS FETs. It should be noted that transistors (and in particular MOS FETs) typically comprise so called body diodes between the drain and the source of a P-channel transistor and between the source and the drain of an N-channel transistor. These body diodes are automatically activated, if the voltage across the transistor exceeds the threshold voltage (also referred to as the diode voltage) of the body diode of the transistor. This has at least two consequences. Firstly, this means that by exploiting the drain-to-source body diodes of the P-channel transistors (i.e. the first and second high side transistors 513, 514) and by exploiting the source-to-drain body diodes of the N-channel transistors (i.e. the first and second low side transistors 511, 514), the rectifier 510 can be operated in an automatic mode (e.g. during a start up phase), without the need of a controlled switching of the switches 511, 512, 513, 514. Secondly, the diode voltage of any of the switches 511, 512, 513, 514 may be used to modulate the voltage drop across the rectifier 510. In particular, each of the switches 511, 512, 513, 514 of the rectifier 510 may be operated in an active mode, thereby providing a reduced transistor voltage drop $V_S$, or in a passive mode, thereby providing the (higher) diode voltage drop $V_D$.

The rectifier 510 of FIG. 5 comprises a first modulation unit 520 configured to modulate the voltage drop across the rectifier 510 during the positive half-wave phase and a second modulation unit 527 configured to modulate the voltage drop across the rectifier 510 during the negative half-wave phase. The first modulation unit 520 comprises an operational amplifier 522 and a voltage source 521 configured to provide an activating gate voltage to the first low side switch 511. The voltage source 521 may be adjustable, thereby adjusting the gate voltage to the first low side switch 511. By adjusting the gate voltage, the resistance of the first low side switch 511 can be adjusted, thereby adjusting the voltage drop across the first low side switch 511. Hence, the operational amplifier 522 and the voltage source 521 are configured to modify the voltage drop across the first low side switch 511.

Furthermore, the first modulation unit 520 comprises a NAND (Not AND) gate 523. The NAND gate 523 is configured to apply an activating gate voltage to the second high side switch 514, if an activating gate voltage is applied to the first low side switch 511 AND if a voltage is applied to the second input port of the NAND gate 523. If no voltage is applied to the second input port, the second high side switch 514 is operated as a body diode with a voltage drop corresponding to the diode voltage $V_D$. On the other hand, if a voltage is applied to the second input port of the NAND gate 523, then an activating gate voltage is applied to the second high side switch 514, thereby putting the second high side switch 514 in the on-state, at a reduced (transistor) voltage drop $V_S$.

The first modulation unit 520 is configured to modulate the voltage drop across the rectifier 510 during the positive half-wave phase of the rectifier 510. The voltage drop may be modified by
- operating the second high side switch 514 as a body diode (leading to a diode voltage $V_D$) or as a switched-on transistor (leading to a possibly adjustable transistor voltage $V_S$). Typical examples are $V_D$ in the range of 0.7V and $V_S$ in the range of 0.2V.
- operating the first low side switch 511 as a body diode (leading to a diode voltage $V_D$) or as a switched-on transistor (leading to a possibly adjustable transistor voltage $V_S$).
- adjusting the gate voltage applied to the first low side switch 511 and/or to the second high side switch 514 (not shown), thereby adjusting the transistor voltage $V_S$, e.g. between ½ and 1 times $V_S$.

Table 1 shows example modulation states and corresponding example voltage drops across the rectifier 510 during the positive half-wave phase. Table 1 indicates for each state, the gate voltage applied to the first low side switch 511 and the gate voltage applied to the second high side switch 514 and the resulting voltage drop across the rectifier 510. It should be noted that Table 1 assumes the same voltage drop $V_D$, $V_S$ across the (P-channel) second high side transistor 514 and across the (N-channel) first low side transistor 511. Typically, the on-resistance of P-channel and N-channel transistors differ significantly. Hence, the appropriate selection of P-channel and N-channel transistors provides a further parameter for implementing a different number N of voltage drops across the rectifier 510, i.e. for implementing different amplitude modulation states.

TABLE 1

| State | 1$^{st}$ low side switch | 2$^{nd}$ high side switch | Total Voltage drop |
|---|---|---|---|
| 1 | No gate voltage | No gate voltage | $2*V_D$ |
| 2 | Full gate voltage | No gate voltage | $V_D + V_S$ |
| 3 | "half" gate voltage | No gate voltage | $V_D + 1/2*V_S$ |
| 4 | Full gate voltage | Full gate voltage | $2*V_S$ |
| 5 | "half" gate voltage | Full gate voltage | $3/2*V_s$ |

The second modulation unit 527 is designed in an analogous manner to the first modulation unit 520, i.e. comprising an operational amplifier 525, a voltage source 524 and a NAND gate 526. The second modulation unit 527 is configured to modulate the voltage drop across the rectifier 510 during the negative half-wave phase of the rectifier 510 (as outlined in the context of the first modulation unit 520).

By modulating the voltage drop across the rectifier 510 (i.e. by varying the resistance of the rectifier 510) (during the positive waveform phase and/or during the negative waveform phase), the current provided by the rectifier 510 may be modulated. This current modulation is coupled via the transformer 506 back to the first subsystem, e.g. to a charging unit, and may be sensed within the first subsystem. Hence, the modulation of the voltage drop across the rectifier 510 can be used to provide a communication path from the second subsystem 500 via the galvanic isolation 506 to the first subsystem. The modulation of the voltage drop does not require any additional components, such as additional resistors or capacitors, for modulating the load current. The modulation of the voltage drop and by consequence the modulation of the load current is performed using the switches 511, 512, 513, 514 already available within the rectifier 510. Furthermore, the modulation of the voltage drop across the rectifier 510 based on the control of the transistors 511, 512, 513, 514 comprised within the rectifier 510 allows for a fast modulation, thereby enabling a high number of modulation states/second, i.e. thereby enabling a fast communication speed between the second subsystem and the first subsystem.

Overall, the functional principle of the rectifier 510 of FIG. 5 can be described as follows. If no gate signals (gate voltages) are applied to the gates of the transistors 511, 512, 513, 514, the transistors 511, 512, 513, 514 act as diodes (due to their body diodes). Such an automatic (passive) operations of some or all of the switches 511, 512, 513, 514 of the rectifier 510 may be used e.g. during a start up phase of the rectifier 510 (e.g. when initially coupling the rectifier 510 to a charging unit via the transistor 506).

The active rectifier 510 may be controlled using the operational amplifiers 522, 525 of the first and second modulation units 520, 527, respectively. The level for activation of the switches 511, 512, 513, 514 (i.e. switch-on or on-state) may be e.g. −100 mV. The drain/source voltage across the switches 511, 512, 513, 514 may be stabilized at −100 mV. These values may be forced by a regulation loop of the operational amplifiers 522, 525. The P channel high side transistors 513, 514 may be activated in parallel to the respective N channel low side transistors 512, 511. As indicated above, the voltage supplied by the voltage sources 521, 524 may be used to adjust the gate voltage applied to the respective low side transistors 511, 512, thereby adjusting the voltage drop across the respective low side transistors 511, 512, i.e. thereby performing amplitude modulation on the current provided by the rectifier 510. It should be noted that the P channel high side transistors 513, 514 are operated in a digital manner in the example of FIG. 5. In an alternative embodiment, the P channel high side transistors 513, 514 may be controlled using separate operational amplifiers (similarly to the low side transistors 512, 511), in order to provide additional states for amplitude modulation.

The modulation may be performed using the modulation units 520, 527 by modulating the drain/source voltage across the low side transistors 511, 512 and/or by modulating the voltage across the high side transistors 513, 514 (transistor switched on—no diode voltage, transistor switched off—diode voltage). The transistors 511, 512, 513, 514 may be operated in a regulated mode, in order to adjust the voltage drop to system requirements (e.g. the modulation amplitude). As already indicated above, other combinations (than those shown in FIG. 5) for modulating the amplitude of the voltage drop across the rectifier 510 are possible (e.g. by using the body diodes of the low side transistors 511, 512).

The modulation of the voltage drop across the rectifier 510 may be performed within a positive and/or a negative waveform phase. This means that each phase (or pulse) of the alternating voltage provided to the rectifier 510 across the transistor 506 may be used to modulate the voltage drop, thereby communicating information from the electronic device 150 to a first subsystem connected to the primary side (i.e. to the first induction coil) of the transistor 506.

Figure 6A:
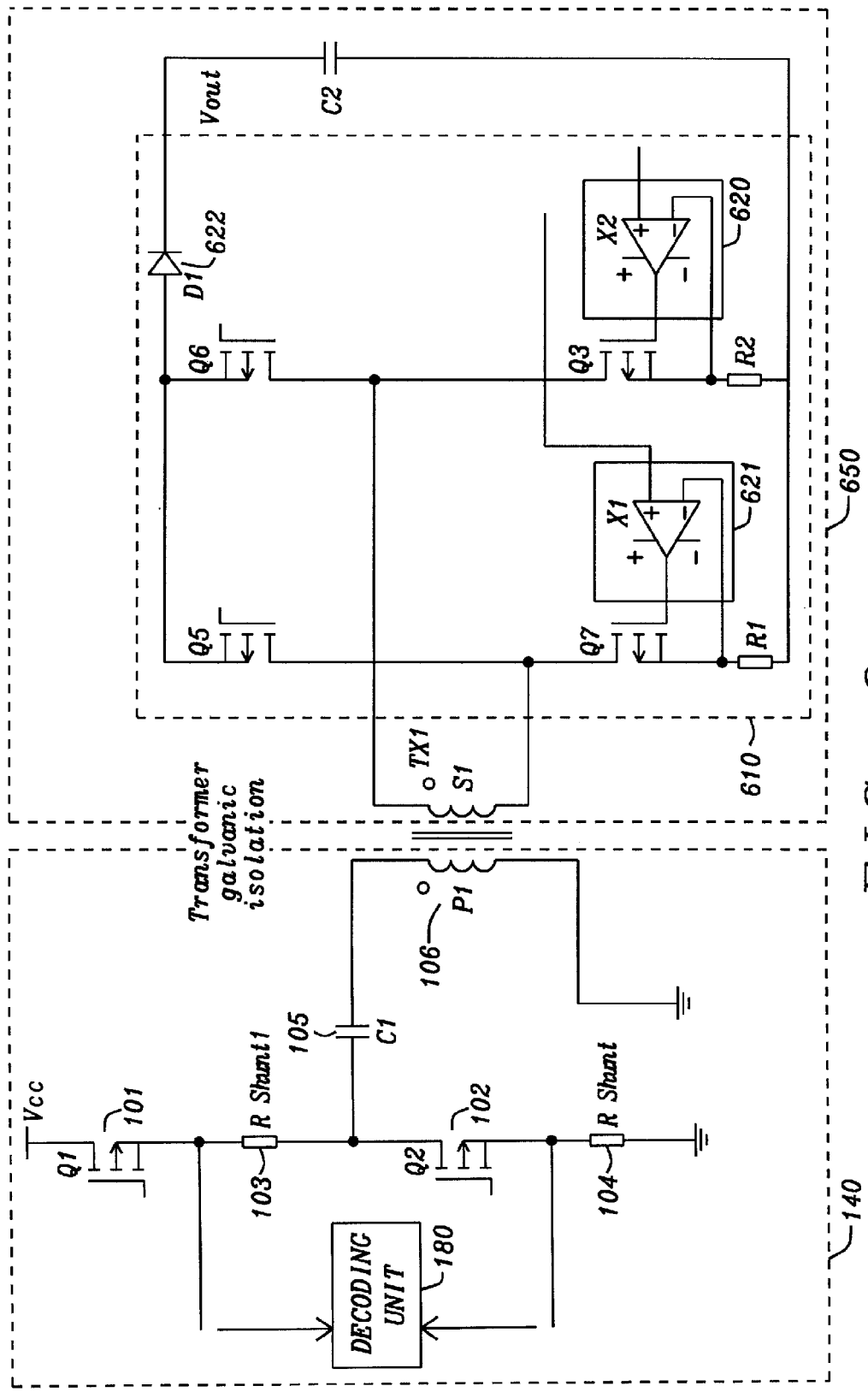
FIG. 6a shows another circuit diagram of an example isolated electrical system comprising a full wave rectifier.

It should be noted that an alternative or an additional option for modulating the voltage drop across the rectifier 510 could be a short circuit of the transformer 506 by switching on all the four switches 511, 512, 513, 514 of the rectifier 510 at the same time for a short period of time. An additional decoupling diode function may be used for such an option, if the capacitor 515 should not be discharged. This is illustrated in FIG. 6a which shows the charging unit 140 of FIG. 1 in combination with an electronic device 650 comprising an active rectifier 610. The operational amplifiers 620 and 621 are used as modulation units for the transistors Q3 and Q7, respectively. During a positive half wave of the alternating voltage, the transistors Q6 and Q7 of the rectifier 610 are in the on-state (or the body diodes of the transistors Q6 and Q7 are forward-biased). The transistor Q7 may be controlled using the operational amplifier 621, thereby controlling the resistance of the transistor Q7 (thereby varying the voltage drop across the active rectifier 610). Alternatively or in addition, the transistor Q3 may be controlled using the operational amplifier 621. The transistor Q3 could be controlled to provide a direct link across the transformer 106 via a variable resistance (provided by the on-resistance of the transistor Q3), even during a positive half wave of the alternating voltage, i.e. even though the body diode of Q3 is reverse biased. Hence, the transistor Q3 could be used during a positive half wave of the alternating voltage, in order to modulate the current, thereby providing alternative or additional modulation means. As indicated above, the diode 622 may be used to ensure that the capacitor C2 is not discharged at time instants when the transistor Q3 is closed (even though the body diode of Q3 is reverse biased).

In other words, the transistors of the rectifier 610 may be used as a current source, thereby providing a modulation of the current within the rectifier 610. As discussed above, the transistor Q7 may be acting as an active diode (during a first half wave of the alternating voltage) and the transistor Q3 may act as an additional current source (by closing the transistor Q3 in a controlled manner during the first half wave of the alternating voltage). As a consequence, a higher current may be added to the system, thereby modulating the current within the rectifier 610 at an increased amplitude.

If all the transistors of the rectifier 610 are switched on, a short circuit will typically occur at the transformer 106. This may be used for protection of the electronic device 650 in emergency conditions (e.g. over load). Furthermore, the short circuit may be used as a means for modulating the current within the rectifier 610. During short circuit situations, the diode D1 622 is acting as a decoupling element. In a short circuit situation, the voltage across the capacitor C2 will be decoupled by the diode D1 622.

Figure 6B:
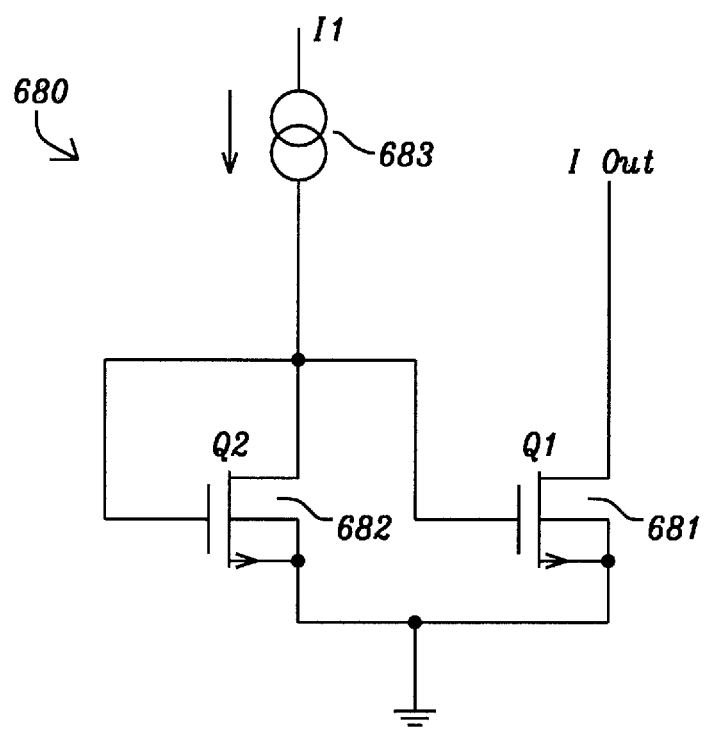
FIG. 6b shows an example implementation of current modulation means.

As an additional option, the active rectifier may be used as a current source, if the reference of the OPAMP (operational amplifier) will be positive. In other words, the active rectifier 610 may comprise a current source for modulation purposes. By way of example, the transistor Q3 and the operational amplifier 620 in FIG. 6a may be replaced by a current source to modulate the current within the active rectifier 610. An example current source 680 is illustrated in FIG. 6b. The example current source 680 comprises a current mirror comprising the input transistor Q2 682 and the output transistor Q1 681. The output transistor Q1 681 may be the transistor Q3 of FIG. 6a. As such, the current through the output transistor Q1 681 (i.e. the current through the transistor Q3 of FIG. 6a) may be controlled by a current source 683 via the current mirror 682, 681. The dimensions (length/width) of the transistors 681, 682 determine a gain of the current mirror 681, 682.

It should be noted that the modulation of the voltage drop at the rectifier 510 (and consequently the modulation of the current provided by the rectifier 510) causes variations of the load current. Such variations of the load current may be disadvantageous for loads requiring a stable load current, as is the case e.g. for SSL devices. For such devices it may be beneficial to perform a modulation of the voltage drop across the rectifier 510 and consequently a modulation of the load current which ensures a constant average current, regardless the modulation state. In other words, the average load current should be independent of the different modulation states. This can be achieved e.g. by performing frequency modulation, at different frequencies. Regardless the frequency, the same average current may be provided to the load. A first state (at a first modulation frequency) may be regarded as the default state where no information is transmitted from the electronic device 500 to a first subsystem connected to the primary side of the transformer 506. The other states (using different modulation frequencies) may be used to transmit information from the electronic device 500 to the first subsystem.

Figure 7:
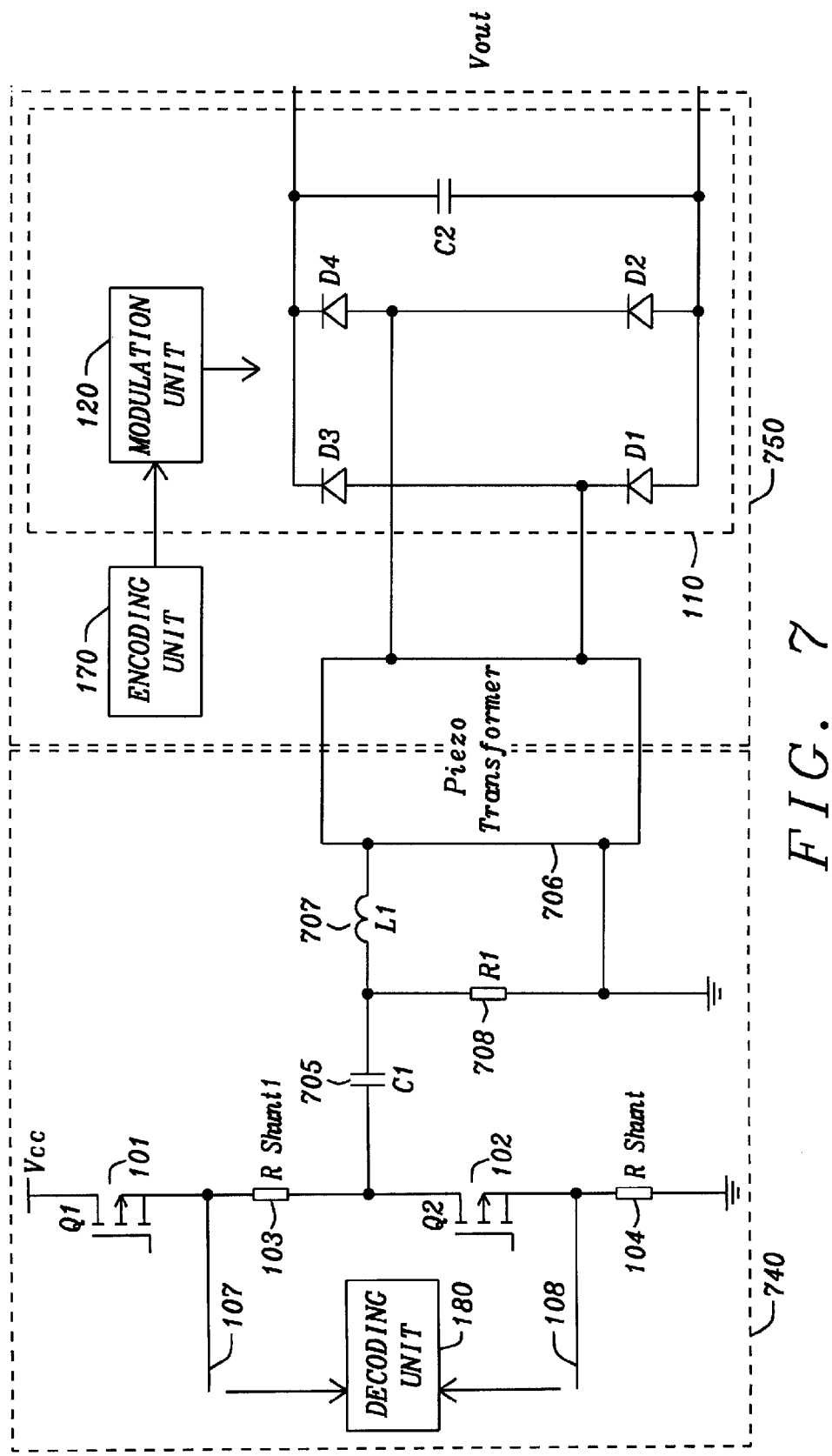
FIG. 7 shows a circuit diagram of an example isolated electrical system comprising a piezo transformer.

FIG. 7 illustrates a circuit diagram of a decoupled system comprising a charging unit 740 and an electronic device 750. The coupling between the two subsystems 740, 750 is performed using a piezo transformer 706, thereby providing a galvanic decoupling between the two subsystems 740, 750. The capacitor C1 705 may be used, if the piezo transformer 706 cannot handle a DC voltage. The resistor R1 708 may be used to define the ground for the piezo transformer 706, so that the voltage after the capacitor C1 705 oscillates between positive and negative. The inductance L1 707 may be used for removing high current spices, because the piezo transformer 706 typically has a relatively large input capacitor. The components 705, 707, 708 are optional.

Figure 8:
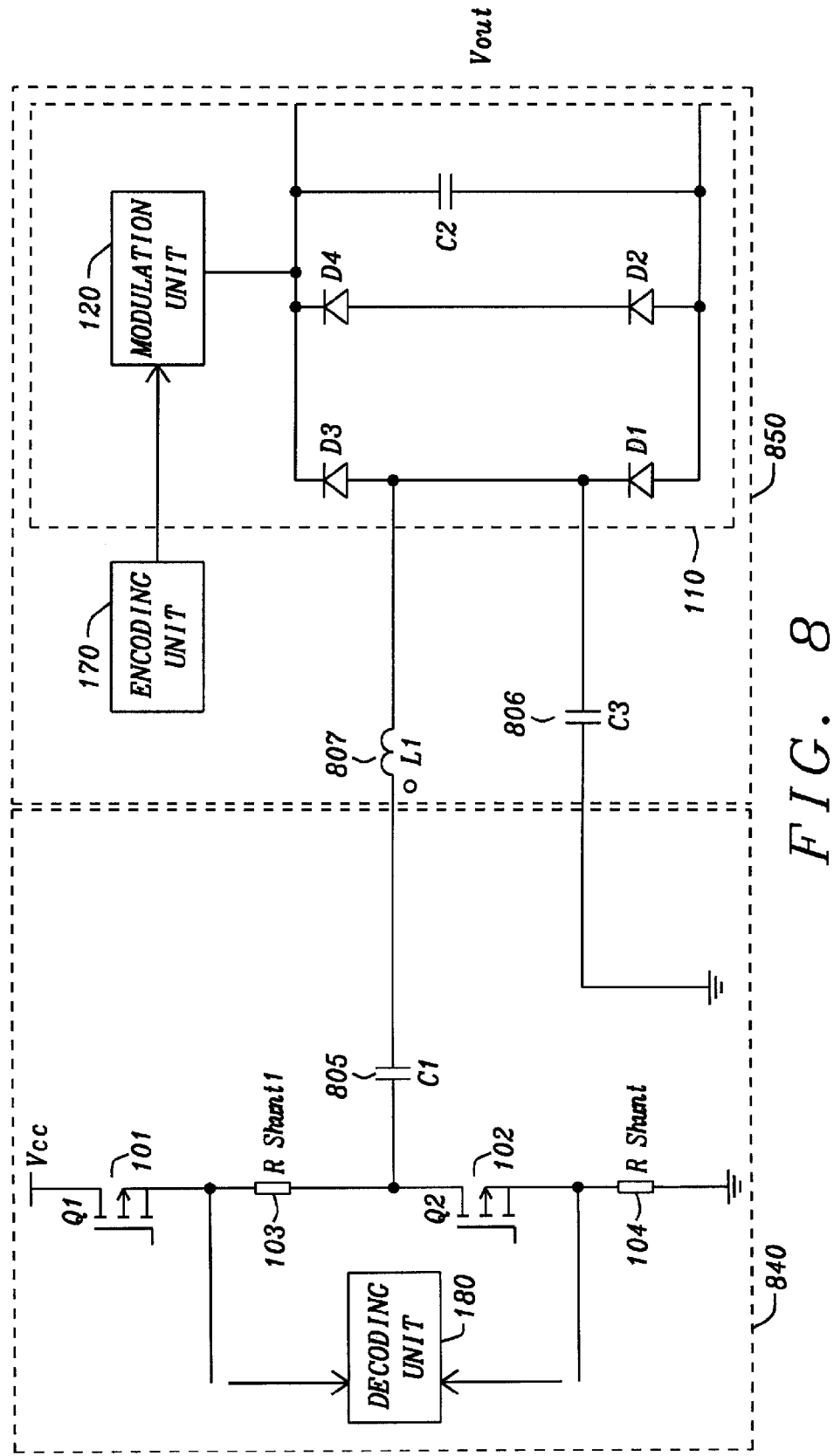
FIG. 8 shows a circuit diagram of an example isolated electrical system comprising a capacitor.

FIG. 8 illustrates a circuit diagram of a decoupled system comprising a charging unit 840 and an electronic device 850. The coupling/decoupling between the two subsystems 840, 850 is performed using the capacitors 805 and 806. That is, the C1 805 and C3 806 are used as decoupling elements. The coil L1 807 may be used for peak reduction and may be used to generate a time constant without losses. Such an isolated system may make use of high voltage capacitors with a relative large size and relatively small capacitive values. The capacitors C1 805, C3 806 may have an isolation voltage of around 1000V or more.

Figure 9:
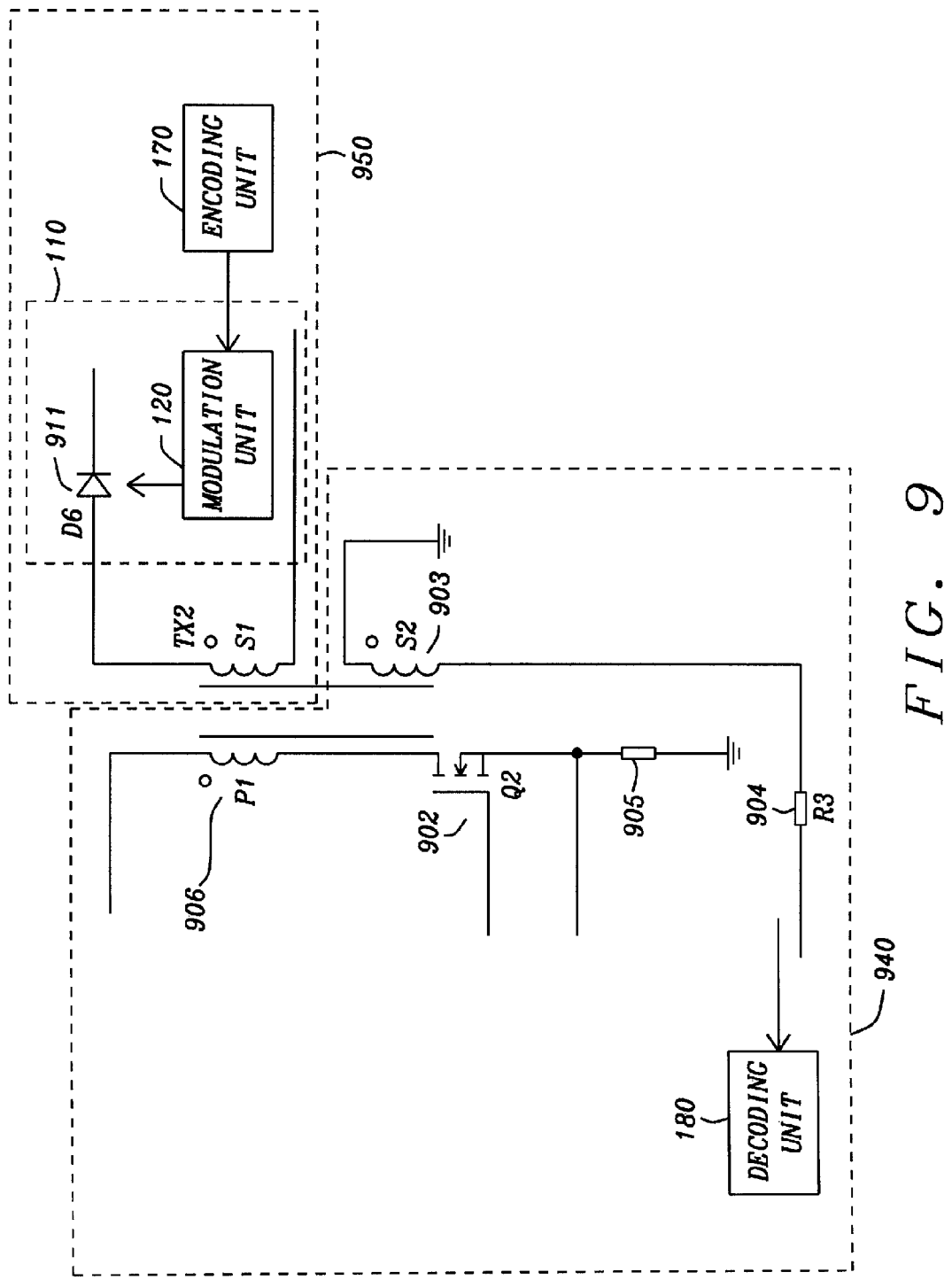
FIG. 9 shows a circuit diagram of an example isolated electrical system comprising a flyback converter.

FIG. 9 illustrates a circuit diagram of a decoupled system comprising a first subsystem 940 and a second subsystem 950. The first and second subsystems 940, 950 jointly form a flyback converter with the coil P1 within the first subsystem 940 and the coil S1 within the second subsystem 950 forming a transformer 906. The transformer 906 comprises an auxiliary coil (or auxiliary winding) S2 903 which functions as a modulation sensing means. The first subsystem 940 comprises a switch Q2 902 which is configured to generate an alternating voltage at the primary coil P1 of the transformer 906. Furthermore, the first subsystem 940 may comprise a shunt resistor 905. The second subsystem 950 comprises the secondary coil S1 of the transformer 906 and a rectifier 110. In the illustrated example of a flyback converter, the rectifier 110 comprises a diode D6 911. The diode D6 911 may be implemented as an active switch, e.g. a transistor, thereby allowing for a modulation of the voltage drop across the rectifier 110. Furthermore, the second subsystem 950 comprises a modulation unit 120 and an encoding unit 170. The modulation unit 120 may be configured to control the voltage drop across the rectifier 110 (e.g. by modulating a resistance of the switch 911). In order to sense the modulation, the first subsystem 903 may comprise the auxiliary coil S2 903 of the transformer 906 which is configured to sense the voltage modulations within the second subsystem 950. As such, the auxiliary coil S2 903 (in combination with an optional resistor R3 904) forms modulation sensing means of the first subsystem 940, which are configured to sense a modulation of the voltage in the second subsystem 950. The sensed modulation may be analyzed by the decoding unit 180.

In a similar manner to the examples described in the previous figures, encoded information may be transmitted from the second subsystem 950 to the first subsystem 940 via the galvanic decoupling provided by the transformer 906. Hence, the communication concept outlined in the present disclosure can also be applied to a flyback converter. In this case the voltage at the auxiliary winding S2 903 may be used to sense the modulation. Flyback converters may be used e.g. in low power LED applications and in the main plug of a charger.

In the present disclosure a method and system for performing fast modulation at a second subsystem of a decoupled system, for communication with a first subsystem of the decoupled system, have been described. The method and system make use of an active rectifier which is modulated, wherein the modulation may be performed in sync with the converter frequency, i.e. with the frequency of an alternating voltage provided by the first subsystem to the second subsystem. The method and system described in the present disclosure allow for a high communication speed with no additional components required in the signal path at the second subsystem. The losses incurred by the method and system described herein can be adjusted by adjusting the modulation amplitude, i.e. by adjusting the amplitude of the modulation of the voltage drop across the rectifier. A minimum required modulation amplitude may depend on the sensitivity of the modulation sensing means used within the first subsystem and on the (inductive) coupling parameters of a transformer used between the first and the second subsystems.

In the present document, the term "couple" or "coupled" refers to elements being in electrical communication with each other, whether directly connected e.g., via wires, or in some other manner.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present disclosure are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

The invention claimed is:

1. A rectification circuit configured to generate a direct current at an output of the rectification circuit subject to an alternating voltage at an input of the rectification circuit and configured to transmit encoded information to a galvanically decoupled electronic subsystem, the rectification circuit comprising
    coupling means at the input, configured to receive the alternating voltage from the galvanically decoupled electronic subsystem;
    a first switch arranged between the coupling means and the output, configured to block current in a first direction and to conduct current in a second direction, opposite to the first direction, thereby contributing to the direct current; wherein a resistance of the first switch, when conducting current in the second direction, is adjustable; and
    a first modulation unit configured to
        receive the encoded information;
        map the encoded information to a sequence of modulation states from a plurality of different pre-determined modulation states of the resistance of the first switch; wherein each of the plurality of pre-determined modulation states specifies a resistance value and/or a temporal evolution of the resistance value of the resistance of the first switch; and
        adjust the resistance of the first switch according to the sequence of modulation states at a clock rate derived from a cycle rate of the alternating voltage, thereby modulating the current conducted by the first switch according to the sequence of modulation states.

2. The rectification circuit of claim 1, wherein
    the coupling means comprises an induction coil of a transformer; and
    the transformer is configured to induce the alternating voltage at the coupling means using an alternating current through a corresponding induction coil of the transformer at the decoupled electronic subsystem.

3. The rectification circuit of claim 1, wherein
    the first modulation unit is configured to adjust the resistance of the first switch according to the plurality of modulation states.

4. The rectification circuit of claim 3, wherein a modulation state of the plurality of modulation states comprises any one or more of:
    adjusting the resistance to one or more of a plurality of resistance values; and
    periodically adjusting the resistance of the first switch between a first and a second resistance value of the plurality of resistance values at one of a plurality of adjustment frequencies.

5. The rectification circuit of claim 4, wherein the plurality of modulation states is such that an average of the direct current in a pre-determined time interval remains substantially constant.

6. The rectification circuit of claim 5, wherein
the first modulation unit is configured to periodically adjust the resistance of the first switch between the first resistance value and the second resistance value at a first frequency of the plurality of adjustment frequencies, thereby providing a first modulation state of the plurality of modulation states;
the first modulation unit is configured to periodically adjust the resistance of the first switch between the first resistance and the second resistance at a second frequency of the plurality of adjustment frequencies, thereby providing a second modulation state of the plurality of modulation states;
the alternating voltage induces current in the second direction in a second phase of the alternating voltage; and
the average direct current during the second phase is substantially the same in the first modulation state and in the second modulation state.

7. The rectification circuit of claim 1, wherein the first switch comprises a transistor.

8. The rectification circuit of claim 1, wherein the first modulation unit is configured to adjust the resistance by adjusting a drive voltage to the first switch.

9. The rectification circuit of claim 1, further comprising
a second switch arranged between the coupling means and the output; wherein the second switch is arranged with an opposed polarity compared to the first switch; wherein the second switch is configured to block current and to conduct current in different phases of the alternating voltage than the first switch; wherein a resistance of the second switch, when conducting current, is adjustable; and
a second modulation unit configured to
receive encoded information;
map the encoded information to a third modulation state from a plurality of different modulation states of the resistance of the second switch; wherein each of the plurality of modulation states specifies a resistance value and/or a temporal evolution of the resistance value of the resistance of the second switch; and
adjust the resistance of the second switch according to the third modulation state of the resistance of the second switch, thereby modulating the current conducted by the second switch according to the third modulation state of the resistance of the second switch.

10. The rectification circuit of claim 1, wherein the first modulation unit is configured to adjust the resistance by adjusting a drive voltage to the first switch.

11. A galvanically decoupled system, comprising
a first subsystem configured to generate a varying current through coupling means; and
a second subsystem comprising a rectification circuit configured to generate a direct current at an output of the rectification circuit subject to an alternating voltage derived from the varying current at an input of the rectification circuit and configured to transmit encoded information to the galvanically decoupled first subsystem; the rectification circuit comprising
coupling means at the input, configured to receive the alternating voltage from the galvanically decoupled first subsystem;
a first switch arranged between the coupling means and the output, configured to block current in a first direction and to conduct current in a second direction, opposite to the first direction, thereby contributing to the direct current; wherein a resistance of the first switch, when conducting current in the second direction, is adjustable; and
a first modulation unit configured to
receive the encoded information;
map the encoded information to a sequence of modulation states from a plurality of different modulation states of the resistance of the first switch; wherein each of the plurality of pre-determined modulation states specifies a resistance value and a temporal evolution of the resistance value of the resistance of the first switch;
adjust the resistance of the first switch according to the sequence of modulation states at a clock rate derived from a cycle rate of the alternating voltage, thereby modulating the current conducted by the first switch according to the sequence of modulation states; and
wherein the first subsystem comprises modulation sensing means configured to detect the sequence of modulation states.

12. The rectification circuit of claim 11, wherein
the coupling means comprises an induction coil of a transformer; and
the transformer is configured to induce the alternating voltage at the coupling means using an alternating current through a corresponding induction coil of the transformer at the decoupled electronic subsystem.

13. The rectification circuit of claim 11, wherein
the first modulation unit is configured to adjust the resistance of the first switch according to the plurality of modulation states.

14. The rectification circuit of claim 13, wherein a modulation state of the plurality of modulation states comprises any one or more of:
adjusting the resistance to one or more of a plurality of resistance values; and
periodically adjusting the resistance of the first switch between a first and a second resistance value of the plurality of resistance values at one of a plurality of adjustment frequencies.

15. The rectification circuit of claim 14, wherein the plurality of modulation states is such that an average of the direct current in a pre-determined time interval remains substantially constant.

16. The rectification circuit of claim 15, wherein
the first modulation unit is configured to periodically adjust the resistance of the first switch between the first resistance value and the second resistance value at a first frequency of the plurality of adjustment frequencies, thereby providing a first modulation state of the plurality of modulation states;
the first modulation unit is configured to periodically adjust the resistance of the first switch between the first resistance and the second resistance at a second frequency of the plurality of adjustment frequencies, thereby providing a second modulation state of the plurality of modulation states;
the alternating voltage induces current in the second direction in a second phase of the alternating voltage; and
the average direct current during the second phase is substantially the same in the first modulation state and in the second modulation state.

17. The rectification circuit of claim 11, wherein the first switch comprises a transistor.

18. The rectification circuit of claim 11, wherein the first modulation unit is configured to adjust the resistance by adjusting a drive voltage to the first switch.

19. The rectification circuit of claim 11, further comprising
a second switch arranged between the coupling means and the output; wherein the second switch is arranged with an opposed polarity compared to the first switch; wherein the second switch is configured to block current and to conduct current in different phases of the alternating voltage than the first switch; wherein a resistance of the second switch, when conducting current, is adjustable; and
a second modulation unit configured to
receive encoded information;
map the encoded information to a third modulation state from a plurality of different modulation states of the resistance of the second switch; wherein each of the plurality of modulation states specifies a resistance value and/or a temporal evolution of the resistance value of the resistance of the second switch; and
adjust the resistance of the second switch according to the third modulation state of the resistance of the second switch, thereby modulating the current conducted by the second switch according to the third modulation state of the resistance of the second switch.

20. The rectification circuit of claim 11, further comprising an encoding unit configured to encode information to be transmitted to the decoupled electronic subsystem, thereby providing the encoded information.

21. The galvanically decoupled system of claim 11, wherein
the first subsystem comprises a half bridge comprising a high side switch and a low side switch, wherein the switches are opened and closed in an opposed and periodic manner, thereby generating the varying current; and
the modulation sensing means comprises a resistor to measure a current through the high side switch and/or the low side switch.

22. The galvanically decoupled system of claim 11, wherein
the first subsystem comprises a first induction coil of a transformer;
the second subsystem comprises a second induction coil of the transformer; and
the transformer is configured to inductively couple the varying current across the first and second subsystems.

23. The galvanically decoupled system of claim 11, wherein
the second subsystem comprises a decoding unit configured to determine the encoded information from the sequence of modulation states.

24. A method for communicating encoded information from a second subsystem to a first subsystem; wherein the first and second subsystems are galvanically decoupled; the method comprising
receiving an alternating voltage from the first subsystem at the second subsystem via coupling means;
blocking current in a first direction and conducting current in a second direction, opposite to the first direction, to provide a direct current; wherein the current is conducted in the second direction via an adjustable resistance;
receiving encoded information;
mapping the encoded information to a sequence of modulation states from a plurality of different pre-determined modulation states of the adjustable resistance; wherein each of the plurality of pre-detennined modulation states specifies a resistance value and/or a temporal evolution of the resistance value of the adjustable resistance; and
adjusting the adjustable resistance according to the sequence of modulation states at a clock rate derived from a cycle rate of the alternating voltage, thereby modulating the conducted current in the second direction according to the sequence of modulation states.

* * * * *